(12) United States Patent
Lubrano et al.

(10) Patent No.: US 11,455,892 B2
(45) Date of Patent: Sep. 27, 2022

(54) PORTABLE AIR-TRAFFIC CONTROL SYSTEM FOR DRONES

(71) Applicant: Involi SA, Lausanne (CH)

(72) Inventors: Emanuele Lubrano, Lausanne (CH); Mélanie Guittet, Lausanne (CH); Cristina Mihalachioiu, Lausanne (CH)

(73) Assignee: Involi SA, Lausanne (CH)

( * ) Notice: Subject to any disclaimer, the term of this patent is extended or adjusted under 35 U.S.C. 154(b) by 378 days.

(21) Appl. No.: 16/604,905

(22) PCT Filed: Apr. 30, 2018

(86) PCT No.: PCT/IB2018/052984
§ 371 (c)(1),
(2) Date: Oct. 11, 2019

(87) PCT Pub. No.: WO2018/203112
PCT Pub. Date: Nov. 8, 2018

(65) Prior Publication Data
US 2020/0388165 A1 Dec. 10, 2020

(30) Foreign Application Priority Data
Apr. 30, 2018 (WO) ................. PCT/IB2018/052984

(51) Int. Cl.
*G06F 19/00* (2018.01)
*G06G 7/70* (2006.01)
*G06G 7/76* (2006.01)
*G08G 5/00* (2006.01)
(Continued)

(52) U.S. Cl.
CPC ........... *G08G 5/0026* (2013.01); *G08G 5/006* (2013.01); *G08G 5/0013* (2013.01);
(Continued)

(58) Field of Classification Search
CPC .. G08G 5/0026; G08G 5/0013; G08G 5/0043; G08G 5/006; G08G 5/0069;
(Continued)

(56) References Cited

U.S. PATENT DOCUMENTS

| | | | |
|---|---|---|---|
| 6,518,918 B1 * | 2/2003 | Vannucci | G01C 5/06 342/174 |
| 9,310,477 B1 * | 4/2016 | Sampigethaya | G08G 5/0091 |
| 9,997,080 B1 * | 6/2018 | Chambers | G08G 5/0013 |
| 10,586,464 B2 * | 3/2020 | Dupray | G08G 5/0043 |

(Continued)

FOREIGN PATENT DOCUMENTS

EP 2506032 A1 10/2012

OTHER PUBLICATIONS

Mobile air traffic control tower TMT 13500 by ("Twist") (Year: 2012).*

(Continued)

*Primary Examiner* — Abby Y Lin
*Assistant Examiner* — Sohana Tanju Khayer
(74) *Attorney, Agent, or Firm* — Blank Rome LLP

(57) ABSTRACT

A miniaturized, portable and automatic air-traffic control (ATC) system to determine the position of air vehicles is described. The system is composed by a portable control tower that detects manned air traffic equipped with ADS-B or transponder, and a computer compatible software to display the position of the detected air vehicles. This system is used in conjunction with a drone system, providing to the latter the air-traffic local information. The information given to the drone system allows performing automatic collision avoidance with the air vehicles detected in the flight area of the drone.

15 Claims, 6 Drawing Sheets

(51) Int. Cl.
*G08G 5/04* (2006.01)
*G08G 7/02* (2006.01)

(52) U.S. Cl.
CPC ......... *G08G 5/0043* (2013.01); *G08G 5/0069* (2013.01); *G08G 5/0082* (2013.01); *G08G 5/04* (2013.01); *G08G 5/045* (2013.01); *G08G 7/02* (2013.01)

(58) Field of Classification Search
CPC ........ G08G 5/0082; G08G 5/04; G08G 5/045; G08G 7/02
See application file for complete search history.

(56) References Cited

U.S. PATENT DOCUMENTS

| | | | |
|---|---|---|---|
| 2004/0246145 A1* | 12/2004 | Andrews | G01C 5/005 340/626 |
| 2008/0191942 A1* | 8/2008 | Smith | G01S 5/0221 342/37 |
| 2014/0028485 A1 | 1/2014 | Nordlie et al. | |
| 2015/0170524 A1 | 6/2015 | Stefani et al. | |
| 2016/0240087 A1* | 8/2016 | Kube | G05D 1/0011 |
| 2017/0229773 A1* | 8/2017 | Lee | H01Q 1/523 |
| 2018/0167131 A1* | 6/2018 | Liu | H04B 3/46 |
| 2018/0330623 A1* | 11/2018 | Fujita | G08G 5/0013 |

OTHER PUBLICATIONS

International Search Report and Written Opinion for PCT/IB2018/052984 dated Aug. 27, 2018, 11 pages.

* cited by examiner

PORTABLE AIR-TRAFFIC CONTROL SYSTEM FOR DRONES

RELATED APPLICATIONS

This application is a national phase of PCT/IB2018/052984, filed on Apr. 30, 2018, which claims the benefit of International Application No. PCT/IB2017/052638, filed on May 5, 2017. The entire contents of these applications are hereby incorporated by reference.

REFERENCE DATA

This application claims priority of International Patent Application PCT/IB2017/052638 filed on May 5, 2017.

TECHNICAL FIELD

The invention disclosed herein relates to UAVs (Unmanned Aerial Vehicles), general aviation aircraft and commercial aircraft. The invention acts as a scaled down aviation air-traffic control system, which provides to the drone pilot or autopilot local information to avoid collisions with air vehicles, especially in the area where the drone is flying and at low altitudes.

BACKGROUND

The present invention relates to radar systems, specifically to ones used to detect, track and monitor air vehicles having cooperative detection systems installed, such as automatic dependent surveillance-broadcast (ADS-B) or transponder.

A drone or unmanned aerial vehicle (UAV) is an air vehicle without a pilot on board. Nowadays, drones come in any size (starting with a few grams weight up to several hundreds of kilos) and their application keep multiplying.

As the drone number increases, the danger of them colliding with manned air traffic grows. In order to avoid accidents, more and more collision avoidance solutions have been proposed in prior art. Those solutions can be categorized as follows:
- radars to detect UAVs;
- sensors installed on UAVs, to detect other air-traffic;
- sensors installed on air-traffic, to detect UAVs.

Accordingly, to avoid a collision, the position of an UAV which is too close to a manned air vehicle is communicated to the ATC (air traffic control) or directly to the pilot in various ways. After that, it is to the pilot to take measures to avoid the collision. Drone number is predicted to considerably grow in the following year. This approach would result in a surcharge of work for the ATC and for the pilot in order to handle the interactions with more and more UAVs.

On the other side, sensors installed on UAVs are very limited in range because of low power allocated to the emitter (this is true especially for drones under 10 kg), resulting in a non-prompt communication with a potentially colliding aircraft. Furthermore, such kind of device drains the autonomy of the drone itself, lowering its flight autonomy.

All of the above technical problems suggest that collision avoidance between UAVs and manned air vehicles should be handled in a way where the traffic information is given directly to the drone (and therefore using its intelligence for the collision avoidance) instead of the manned vehicle, while not adding another technical device to the drone itself.

SUMMARY

The system described herein addresses the collision avoidance issue between UAVs and manned air traffic, by providing to the drone pilot or autopilot the air traffic status around the drone. In this way, the drone (and not the manned aircraft) can act automatically and avoid the traffic before the collision. The first advantage of this approach is that the full potential of the drone autopilot is used, as the system does not rely on conventional ATC or on the manned pilot, consequently not surcharging those groups of professionals.

In order to obtain a good air situation awareness around the area where the drone is flying, without adding hardware on the drone, a hardware to detect the traffic is installed on the ground, close to the drone operator. The hardware consists of a portable control tower capable of detecting air traffic equipped with ADS-B (a new standard to communicate air traffic position) and/or a transponder (an older standard for the same purposes). Detecting air-traffic equipped exclusively with a transponder is a real advantage because this kind of traffic flies in the same areas used by drones, at the same low altitudes.

The positions read with the portable control tower are transformed in GPS coordinates, then the direction, speed and altitude of the air vehicles are computed by a software acting as an automatic air-traffic controller. All such information is provided either to the drone pilot (which will act manually to avoid the collision) or to the drone autopilot (which will be able to avoid the collision automatically).

The present disclosure concerns a portable air-traffic control system comprising:
- a plurality of portable mini control towers (each composed by an ADS-B receiver, a miniaturized version of an aviation SSR (secondary surveillance radar), a pressure sensor, a GPS antenna, a magnetometer, a battery and a computer where all those devices are connected), to detect air vehicles equipped with ADS-B or transponder;
- a specific software, to be incorporated in a computer or a tablet, acting as an automatic air-traffic controller, allowing the display of the GPS positions of the air vehicles detected by the portable control tower, and allowing the eventual collision avoidance;
- a connection to an external drone system, Such connection allows the direct reading of the air traffic situation by the drone autopilot or the drone pilot.

In an embodiment, the system portability is limited and the battery is replaced by a fixed connection to the power network, called fixed mini control tower.

In an embodiment, the multiple fixed mini control towers are inter-connected to the same air-traffic controller, to extend the coverage range of the whole system.

The present disclosure also concerns a procedure to transform the reading of a miniaturized aviation SSR to GPS coordinates.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS

Herein below, there is a description of the various components and mechanisms embodied by the invention, with reference to the related drawings, depicting specific combinations resulting in the invention's use. This does not exclude the fact that other embodiments may be used and/or that modifications to the structure can be made without limiting the scope herein.

A portable air-traffic control system to detect aircraft as to enable UAVs to avoid collision with said detected aircraft is presented here. The problems addressed are the following: 1) lack of efficient and complete means for giving manned air traffic information to an UAV pilot or autopilot, 2) weight and consumption of sensors to embark on drone system to detect such traffic.

It is described herein a miniaturization of aviation technologies represented by a system with low radiated power, enabling compliance with urban safety regulations. At the same time, the system ensures fast and easy installation.

Figure 1:
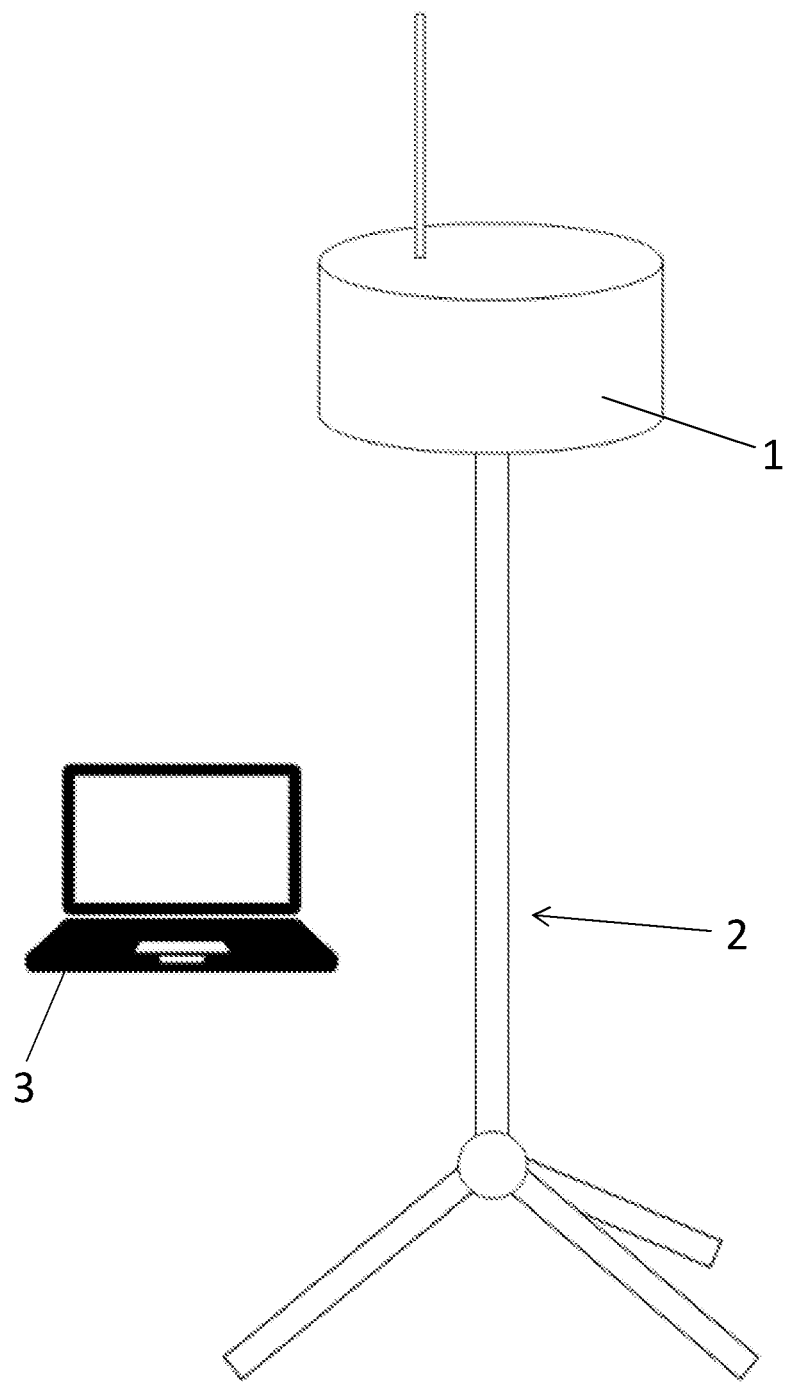
FIG. 1 shows a portable air-traffic control system comprising a control tower, according to an embodiment.

Reference is now made to FIG. 1, that schematically illustrates the complete system. The system can be composed of two parts, (i) a portable control tower 1 and (ii) a software on a computing device 3, that combined will act as an automatic air traffic controller. The portable control tower 1 can be mounted on a tripod 2 in order to gain height. The control tower 1 in this configuration provides an azimuthal coverage from 0° to 360°, within a predefined range of elevations below and above the horizon.

Figure 2:
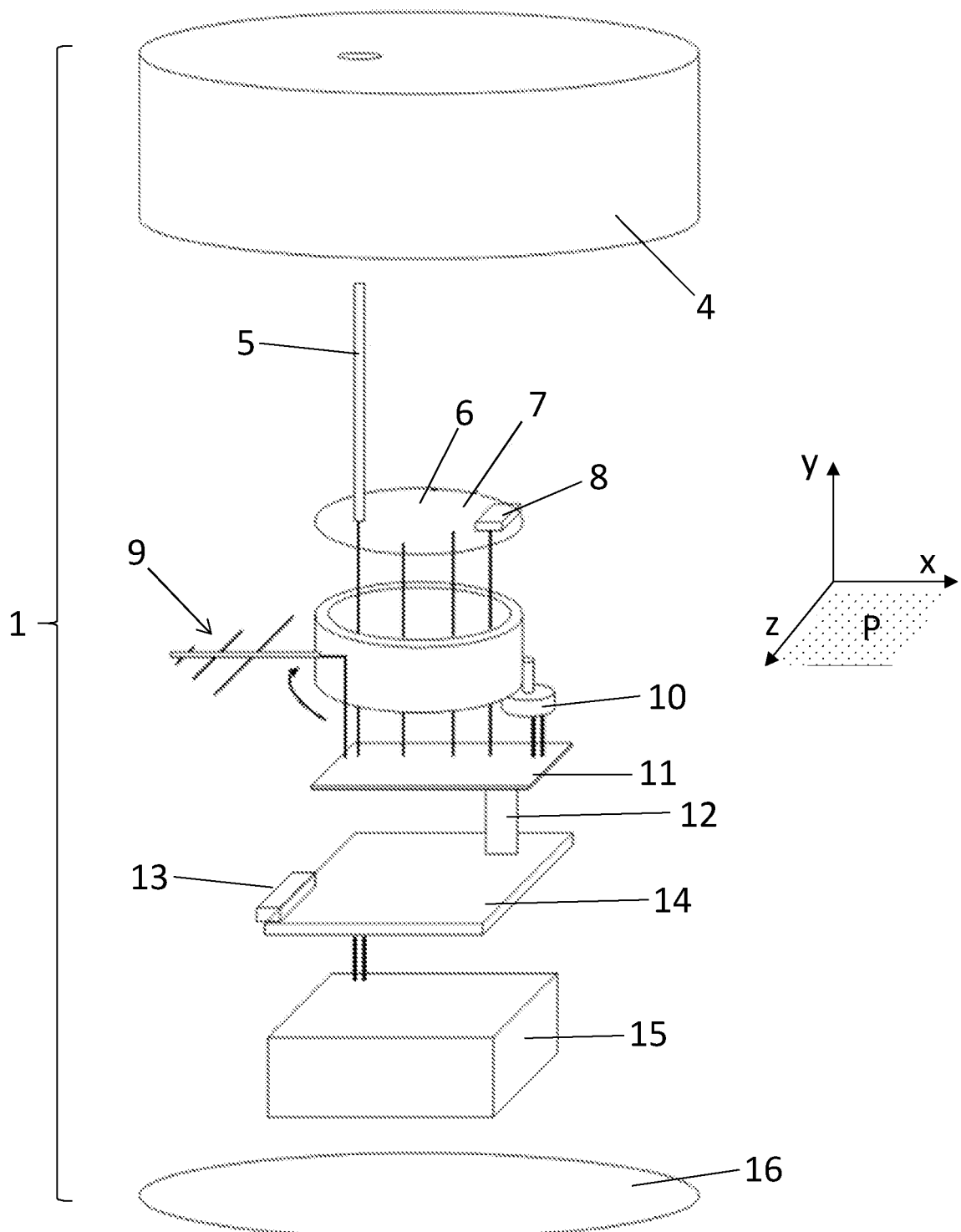
FIG. 2 shows an exploded view of the portable control tower.

Reference is now made to FIG. 2, which shows an exploded view of the control tower 1 and shows parts composing the portable control tower 1. The system is mounted over a robust bottom cover 16, which gives support to all mechanical and electronic parts of the portable control power 1. Moreover, the bottom cover 16 contains the mechanical interface to mount the portable control tower 1 on the tripod 2. On top of the system, a plastic top cover 4 protects all the components from rain and other environmental threats. Just under the top cover 4, it is possible to find the following components: a first antenna 5 (preferably a 1090 MHz antenna 5) for receiving an ADS-B signal and/or a transponder signal, a GPS antenna 6, a pressure sensor 7, and a magnetometer 8.

Under this first layer of components, there is a second antenna 9 (preferably a 1030 MHz antenna). The second antenna 9 can be omnidirectional or directional. In the case the second antenna 9 is directional, it can be configured to rotate around the vertical axis (along the y axis in FIG. 2), parallel to the horizontal plan (P, perpendicular to the y axis). A motor 10 (such as a stepper motor) allows the second antenna 9 to have a precise rotation.

All the antennas 5, 9, sensors 7, 8 and devices 6 introduced until now are connected to a PCB (printed circuit board) 11, which contains all the filters and amplifiers for the correct functioning of the described sub-systems. This PCB 11 acts as an interface between the sensors/antennas and a computer motherboard (i.e., a processing unit) 14, which is just below. The connection between the PCB 11 and the processing unit 14 is ensured by a flex cable 12. A Wi-Fi USB key (i.e., a connecting module that can also include any type of wired or wireless network connection, such as ethernet, 4G, Bluetooth, etc.) 13 is plugged in the (for example via a USB port of the) processing unit 14, in order to provide connectivity to the whole system. Finally, a battery 15 provides power to all the system (or to the control tower 1). Alternatively, the control tower 1 can be connected to any source of electricity.

Figure 3:
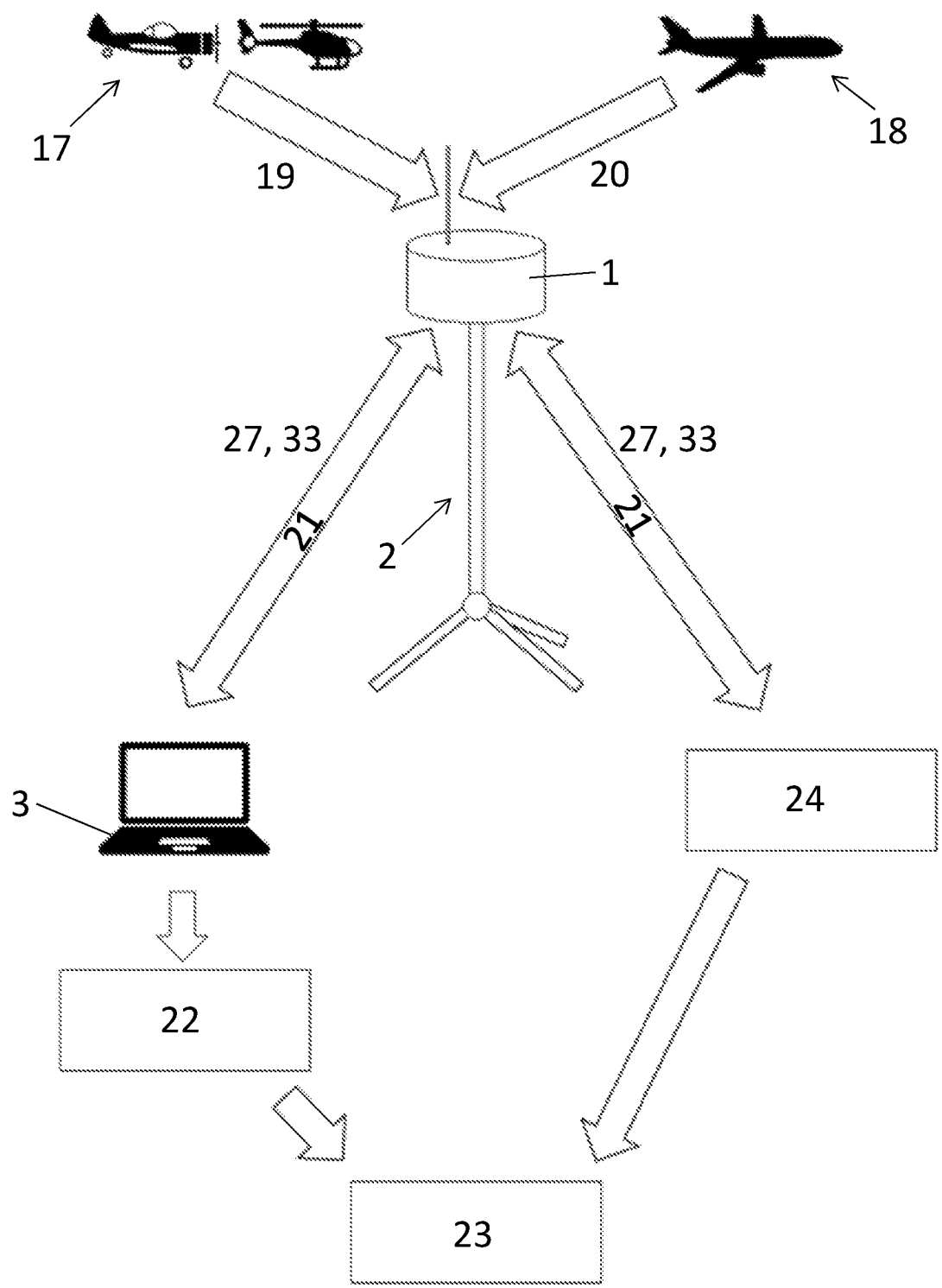
FIG. 3 is a scheme showing how the position of the air vehicles is received, computed and communicated to the drone.

Reference is now made to FIG. 3, which shows how air-traffic positions are communicated to a drone 23 (or any unmanned aerial vehicle, often called "drone" or "UAV" in the present text). Both transponder air vehicles 17 equipped exclusively with transponder, and ADS-B air vehicles 18 equipped with ADS-B 28 emit a signal, respectively shown by numerals 19 (transponder signal) and 20 (ADS-B signal) in FIG. 3, which is read and decoded by the portable control tower 1. The explanations on the protocol of those signals are not provided here as it is a state-of-the-art information. For clarity reasons, the frequency carrying this signal is specified and is 1090 MHz.

The air-traffic information, i.e., an air traffic information signal 27 and/or a fencing information signal 33 (see below), is elaborated and is used to avoid the drone 23 colliding against the detected air traffic (detected air vehicles 17, 18). This is carried out in two ways, depending on how the drone 23 is controlled. In the case where the drone is remotely piloted by a drone pilot having a UAV remote control 22, a computing device (for example a computer or a tablet) 3 is used to display the air-traffic information surrounding the drone 23. The information 27, 33 is sent to the computing device 3 via a communication link 21 (such as a WIFI link). The UAV pilot will see an intuitive 2D and/or 3D map (not shown) that will allow him to easily direct the drone 23 away from traffic. In the case where a drone (or UAV) control system 24 is used in an autonomous way to pilot the drone 23, the control tower 1 will send the traffic information 27, 33 to the drone control system 24 via the same communication link 21. The drone control system 24, having the traffic information available, will use collision avoidance algorithms to avoid the danger. The two way of using the system, i.e., whether the drone 23 is piloted by a pilot using the UAV remote control 22 or autonomous using the drone control system 24, could eventually be used at the same time, depending on the capabilities of the drone control system 24. For example, the pilot using the UAV remote control 22 will fly the drone 23, then in the case of imminent collision the drone control system 24 will "take the control" and avoid the collision.

Figure 4:
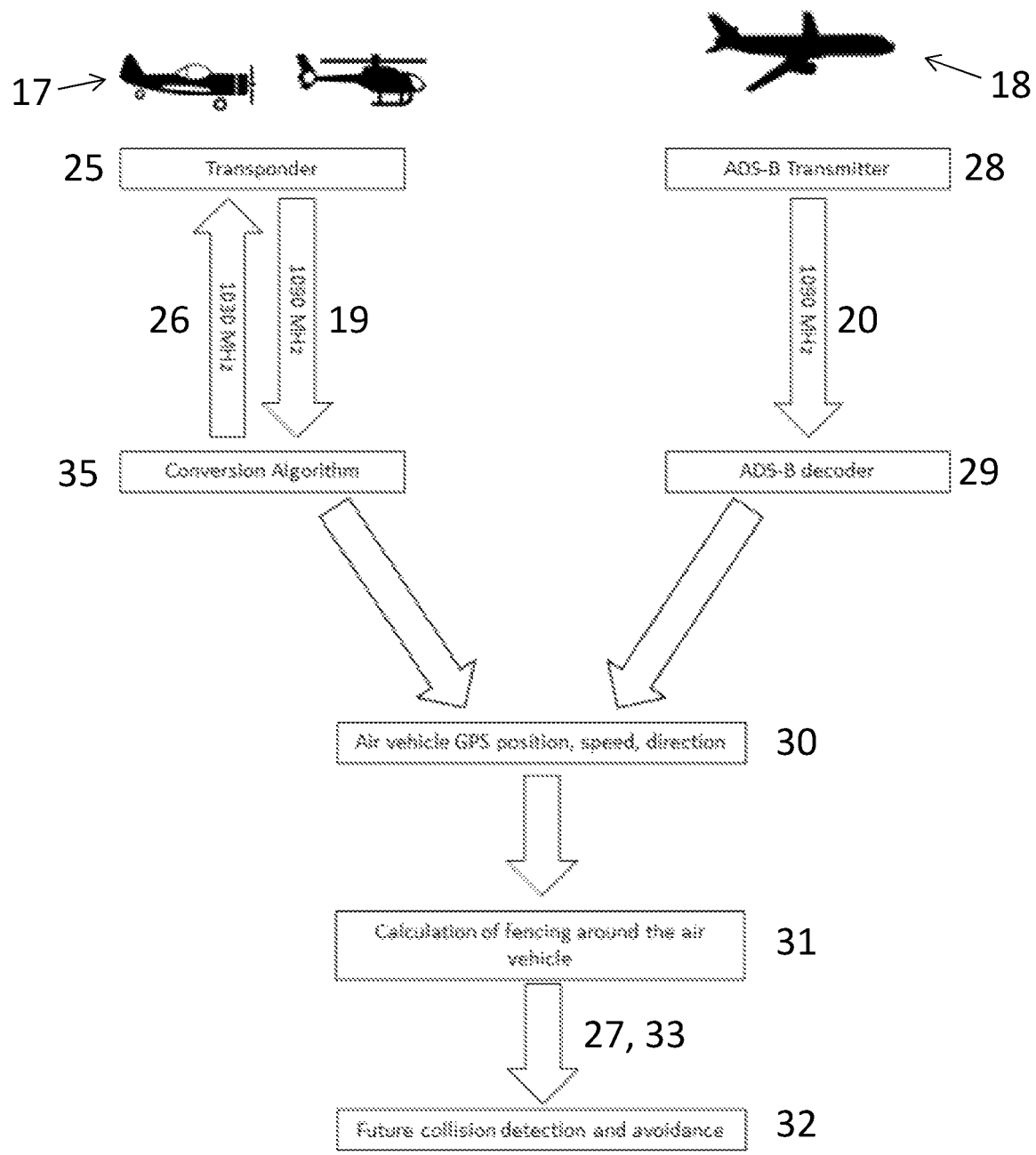
FIG. 4 is a scheme showing the data processing performed to extrapolate the position of the air vehicles.

Reference is now made to FIG. 4, which explains the operations done to extrapolate the position reading of the air traffic.

The transponder air vehicles 17 equipped exclusively with a transponder 25 will broadcast their signal (transponder signal 19) exclusively when they receive a particular message (directional message 26) on the frequency 1030 MHz. This directional message 26 is issued by the second antenna 9. Since this antenna 9 can be directional, the transponder 25 on the aircraft 17 will receive the directional message 26 only if the second antenna 9 is exactly oriented towards its direction (i.e., oriented towards the direction of the air vehicle 17 equipped exclusively with a transponder 25). This allows the control tower 1 to know the relative angle between the North of the control tower 1 and the air vehicle 17. The time between the sent directional message 26 and the received message (transponder signal 19) allows calculation of the distance between the second antenna 9 and the aircraft 17. Finally, the aircraft 17 sends in an encoded way its altitude. Thanks to an algorithm that will be explained later, those readings are converted to GPS coordinates by using a conversion code 35.

The ADS-B air vehicles 18 will send their GPS position in an encoded way. A block of software (ADS-B decoder code 29) inside the portable control tower 1 will simply decode the position (of the air vehicles 18) using state-of-the-art algorithms.

At this point, all air traffic positions (i.e., positions of the detected transponder air vehicles 17 and ADS-B air vehicles 18) are described via the GPS standard. Another block of software (traffic information code 30) will simply use multiple position reading of the same aircraft 17, 18 to add speed and direction to the already known information.

All those data are used by a final block of code (fencing calculation code 31) that will calculate a fencing area (not shown) around the aircraft 17, 18 and provide a corresponding fencing signal 33. This fencing is dependent on the speed and the direction of the aircraft. There are different algorithms to calculate this fencing, one is explained here just as an example: a circle representing the fencing is drawn around the air vehicle. The range of the circle corresponds to the distance covered by the air vehicle in 45 seconds. Consequently, to a faster aircraft will correspond a circle with a bigger range.

The air-traffic information, i.e., an air traffic information signal 27) and/or the information regarding the fencing (fencing information signal 33), is finally sent to the drone control system 24 or drone autopilot (UAV remote control 22), where a piece of code (collision assessment code 32) will take such information (air traffic information signal 27 and/or fencing information signal 33) into account, compare it with the current position, speed and direction of the UAV 23 and decide if there is a danger of collision, and, if the case, will take measures to avoid any accident.

Figure 5:
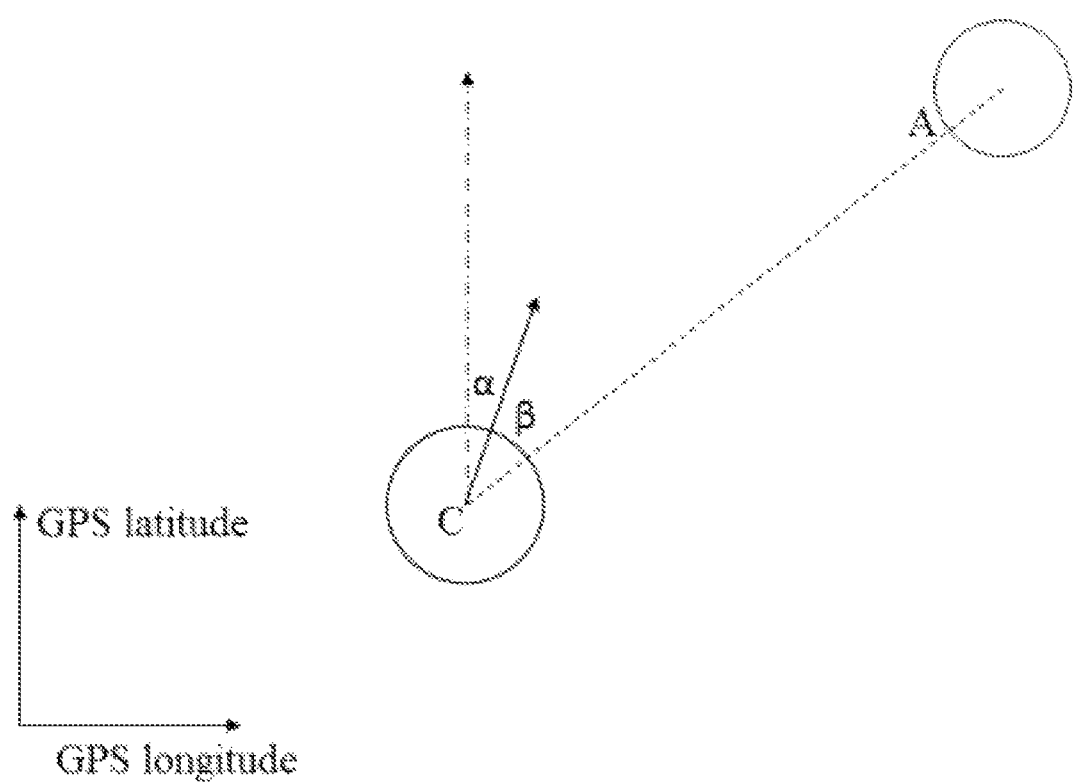
FIG. 5 is a scheme needed to understand how the conversion from transponder reading to GPS coordinates is performed.

Reference is now made to FIG. 5, where the algorithm to find the GPS position of the transponder aircraft 17 is explained.

The point C represents the GPS position of the control tower 1 (as a reminder, the control tower 1 is equipped with the GPS antenna 6, while the angle α is the difference between the North of the control tower 1 and the magnetic North, measured by using the magnetometer 8. The GPS position gives the altitude of the control tower 1, but a second altitude reading is also obtained by the pressure sensor 7. All these parameters (i.e., angle α, GPS position and altitude reading) define exactly the position, altitude and orientation of the portable control tower 1.

As mentioned before, the transponder aircraft 17 will send its transponder message 19 exclusively when the second antenna 9 is pointed towards its direction (the direction of the transponder aircraft 17). This will happen when the second antenna 9 draws the angle β respect to the North of the control tower 1. The angle toward the magnetic North is, therefore, α+β. The altitude of the transponder aircraft 17 is sent encoded in the message end easily decodable. This altitude is expressed in respect to standard pressure, so, using the pressure reading of the control tower 1, it will be used to calculate the GPS altitude of the transponder aircraft 17.

The distance AC between the transponder aircraft 17 and the control tower 1 is easily calculated by using state-of-the-art techniques related to the SSR radar.

Finally, knowing the angle α+β, the distance AC, the GPS position of C, and the GPS altitude of A, it is a trivial trigonometric problem to calculate the GPS position of A.

It is understood that many changes and variations of the above are possible, even without exceeding the spirit of the invention, if ordinary skills in the art are held. Accordingly, the shown embodiments are to be considered as examples only and not as limiting the invention, as the related claims and various embodiments define such invention.

For instance, even if a certain combination of elements is given in the claims, this does not exclude other setting out of elements described above, irrespective whether initially claimed or not in such combination, since they can be otherwise combined or used alone.

It is to be mentioned that the terminology used herein, either to describe the invention, the claims or otherwise, is not to be understood as limited to its most common sense, but all terms must be construed as implying the broadest signification thereof.

Thus, the elements referred to in the description and claims or elsewhere herein are to be read as to include all equivalent elements which combined substantially in the same way have substantially the same results and/or substantially perform the same functions. Similarly, it is to be understood that a specific combination herein does not exclude for the same purposes other combinations of the same elements resulting in similar results or parts thereof. In other words, it is implied that the elements referred to herein and the combinations thereof may be combined is as many ways as necessary to achieve similar results or parts thereof as the specifically described ones.

Other configurations of the control tower 1 are possible. For example, the disposition of the different components (first antenna 5, GPS antenna 6, pressure sensor 7, magnetometer 8, second antenna 9 and processing unit 14) can differs that the one shown in FIG. 2. The processing unit 14 can comprise any type of processing unit 14 configured for processing the ADS-B signal 20 emitted by the transponder 25 and received by the control tower 1, and generate the air traffic information signal 27.

In an embodiment, the system may further comprise an external computing unit 34 (see FIG. 6) configured for receiving data collected by the control tower 1 (transponder signal 19 and/or ADS-B signal), for running the computation algorithms (conversion code 35, ADS-B decoder code 29, traffic information code 30 and/or fencing calculation code 31), and for sending the air traffic information (air traffic information signal 27 and/or the fencing information signal 33) to the drone control system 24 and/or drone autopilot (UAV remote control 22).

Figure 6:
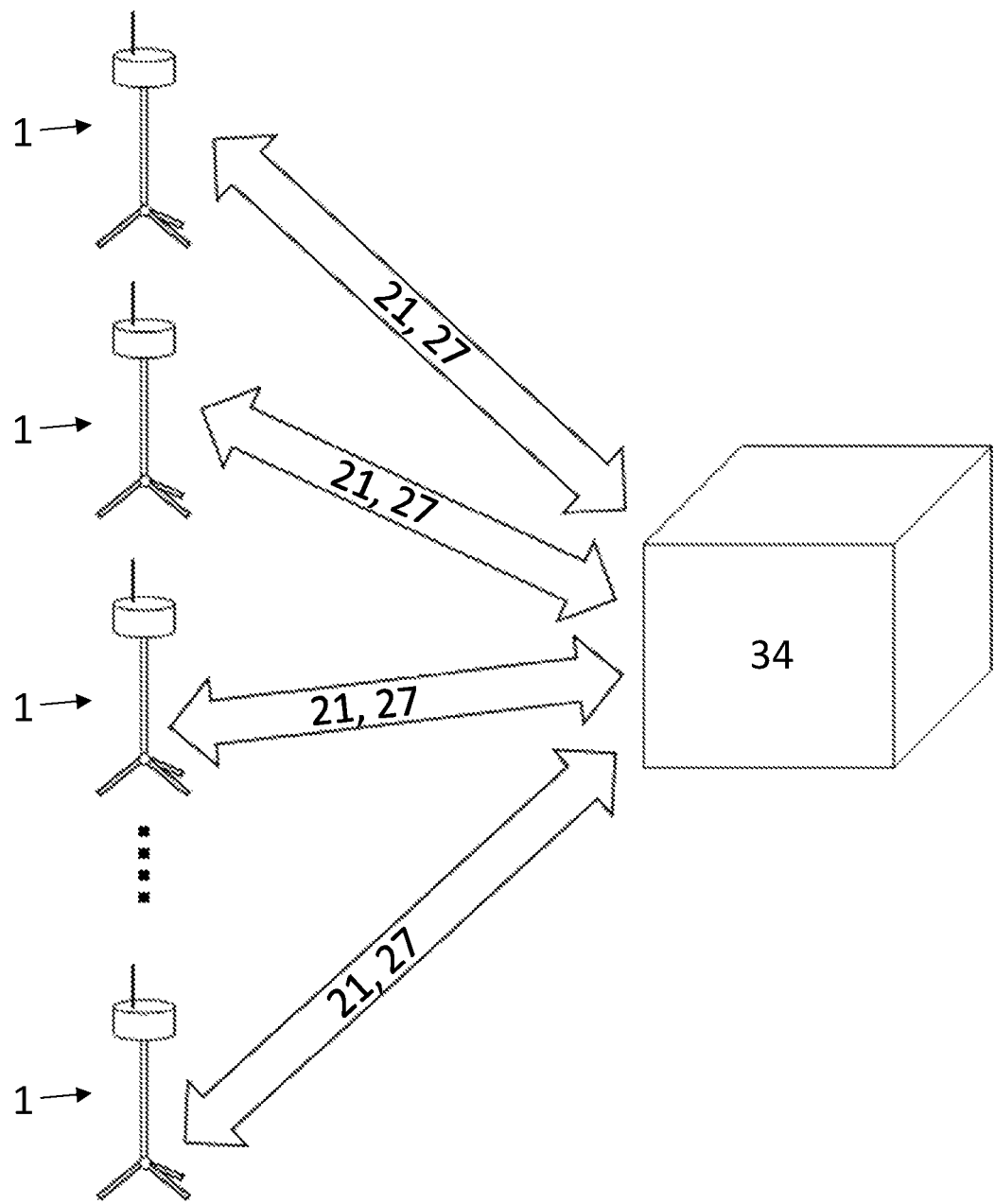
FIG. 6 shows the air-traffic control system comprising a plurality of the control tower, according to an embodiment.

In an embodiment shown in FIG. 6, the control system comprises a plurality of the control tower 1. Each control tower 1 can be inter-connected to at least one external processing unit 34. Since the control towers 1 can be distributed over a given geographic area, the control system according to this embodiment allows for extending the coverage range.

The control system can comprise positioning code (to be run on the external processing unit 34), such as but not limited to triangulation and/or multilateration), in order to calculate the position of detected aircraft via air traffic information.

Again, the external computing unit 34 can be configured for receiving data collected by the plurality of control towers 1, for running the computation algorithms, and for sending the air traffic information to the drone control system 24 and/or drone autopilot 22. The external computing unit 34 can further be configured for sending the air traffic information to a plurality of drone control systems 24 and/or drone autopilots 22

The plurality of control towers 1 can be installed and/or deployed on different (i) telecommunication antennas, including without limitation 4G antennas and/or television broadcast antennas and/or radio broadcast antennas, (ii) aviation infrastructure, (iii) electricity infrastructure, (iv) public utilities infrastructure, (v) railway infrastructure and/or (vi) other transportation infrastructure, (vii) real estate infrastructure and/or (viii) satellite infrastructure.

REFERENCE NUMBERS AND SYMBOLS 1 control tower
2 tripod
3 computer
4 top cover
5 first antenna
6 GPS antenna
7 pressure sensor
8 magnetometer
9 second antenna
10 motor
11 printed circuit board (PCB)
12 flex cable
13 connecting module
14 processing unit
15 battery
16 bottom cover
17 air vehicle equipped with
18 air vehicle equipped with ADS-B
19 transponder signal
20 ADS-B signal
21 communication link
22 drone remote control
23 drone
24 drone control system
25 transponder
26 directional message
27 air traffic information signal
28 ADS-B
29 ADS-B decoder code
30 traffic information code
31 fencing calculation code
32 collision assessment code
33 fencing information signal
34 external processing unit
35 conversion code
α angle
β angle

The invention claimed is:

1. A portable air-traffic control system for detecting one or a plurality of transponder air vehicles emitting a transponder signal or automatic dependent surveillance-broadcast (ADS-B) air vehicles emitting an ADS-B signal, and for avoiding collision between the detected air vehicles and unmanned aerial vehicles (UAV); the portable control system comprising a plurality of portable control towers, each portable control tower including:
 a first antenna configured for receiving the transponder signal and the ADS-B signal;
 a second antenna configured for transmitting the transponder signal to the one or the plurality of transponder air vehicles;
 the portable air-traffic control system further comprising an external computing unit configured for receiving the transponder signal and the ADS-B signal from each of the plurality of portable control towers;
 the external computing unit being further configured for running a conversion code to converted the received transponder signal, and an ADS-B decoder code for decoding the ADS-B signal, in order to determine positions of the one or the plurality of detected transponder air vehicles and ADS-B air vehicles, respectively;
 the external computing unit being further configured for running a traffic information code to calculate a speed and direction for the one or the plurality of detected transponder air vehicles and ADS-B air vehicles, from the determined positions;
 the external computing unit being further configured for running a fencing calculation code for calculating a fencing information signal containing a global positioning system (GPS) position, a speed and altitude for each of the detected transponder air vehicles and ADS-B air vehicles;
 the external computing unit being further configured for sending the fencing information signal to an external control device controlling the UAV, such that the UAV can be controlled to avoid the collision with the transponder air vehicles and ADS-B air vehicles.

2. The control system according to claim 1,
 wherein said external control device comprises a computing device of a UAV remote control comprising a display; and
 wherein said fencing information signal is configured to be used in combination with the computing device to display air-traffic information on the display.

3. The control system according to claim 1,
 wherein said external control device comprises a UAV control system and
 wherein said fencing information signal is configured to be used in combination with the UAV control system to pilot the UAV in an autonomous way to avoid the collision with the transponder air vehicles and ADS-B air vehicles.

4. The control system according to claim 1, wherein the first antenna comprises a 1090 MHz directional and/or omnidirectional antenna.

5. The control system according to claim 1, wherein each of the control tower further comprises a pressure sensor configured for measuring a second altitude reading of each of the control tower.

6. The control system according to claim 1, wherein each of the control tower further comprises a GPS antenna configured for measuring a GPS position of each of the control tower.

7. The control system according to claim 1, further comprising a magnetometer configured for measuring the magnetic North of the control tower.

8. The control system according to claim 1, wherein each of the control towers are distributed over a given geographic area.

9. The control system according to claim 1, wherein the external computing unit is configured for sending the air traffic information to a plurality of the external control device.

10. A method for generating an air traffic information signal using a control system, comprising a plurality of portable control towers, each portable control tower including:
 a first antenna configured for receiving a transponder signal and an automatic dependent surveillance-broadcast (ADS-13) signal;

a second antenna configured for transmitting the transponder signal to one or a plurality of transponder air vehicles;

the portable air-traffic control system further comprising an external computing unit configured for receiving the transponder signal and the ADS-B signal from each of the plurality of portable control towers;

the external computing unit being further configured for running a conversion code to converted the received transponder signal, and an ADS-B decoder code for decoding the ADS-B signal, in order to determine positions of the one or the plurality of detected transponder air vehicles and one or a plurality of ADS-B air vehicles, respectively;

the external computing unit being further configured for running a traffic information code to calculate a speed and direction for the one or the plurality of detected transponder air vehicles and ADS-B air vehicles, from the determined positions;

the external computing unit being further configured for running a fencing calculation code for calculating a fencing information signal containing a GPS position, a speed and altitude for each of the detected transponder air vehicles and ADS-B air vehicles;

the external computing unit being further configured for sending the fencing information signal to an external control device controlling the UAV, such that the UAV can be controlled to avoid the collision with the transponder air vehicles and ADS-B air vehicles;

the method comprising:
  receiving the ADS-B signal and the transponder signal; and
  processing the received ADS-B signal and the received transponder signal, to generate the fencing information signal containing a global positioning system (GPS) position, a speed and altitude for each of the detected transponder air vehicles and ADS-B air vehicles.

11. The method according to claim 10,
wherein the portable control tower further comprises a GPS antenna, a pressure sensor and a magnetometer; and
wherein said processing the received transponder signal comprises:
  determining a control angle between the North of the control tower and the magnetic North by using the magnetometer;
  determining an antenna angle between the transponder antenna when pointed towards the direction of a detected air vehicle and the magnetic North;
  determining a control position and a first altitude value of the control tower by using the GPS antenna;
  determining a distance between the control tower and the detected air vehicle;
  determining a GPS altitude of the detected air vehicle by using the pressure sensor; and
  calculating a GPS position of the detected air vehicle from the determined control angle, antenna angle, control position, first altitude value, distance and GPS altitude.

12. A non-transitory computer medium comprising portions of code for a software application, including a conversion code, an ADS-B decoder code, a traffic information code, and a fencing calculation code, destined to be executed in an external computing unit in order to perform a method for generating an air traffic information signal using a control system, comprising a plurality of portable control towers, each portable control tower including:
  a first antenna configured for receiving a transponder signal and an automatic dependent surveillance-broadcast (ADS-B) signal;
  a second antenna configured for transmitting the transponder signal to the transponder air vehicles;
  the portable air-traffic control system further comprising the external computing unit configured for receiving the transponder signal and the ADS-B signal from each of the plurality of portable control towers;
  the external computing unit being further configured for running the conversion code to convert the received transponder signal, and the ADS-B decoder code for decoding the ADS-B signal, in order to determine positions of the detected transponder air vehicles and ADS-B air vehicles, respectively;
  the external computing unit being further configured for running the traffic information code to calculate a speed and direction for the detected transponder air vehicles and ADS-B air vehicles, from the determined positions;
  the external computing unit being further configured for running the fencing calculation code for calculating a fencing information signal containing a GPS position, a speed and altitude for each of the detected transponder air vehicles and ADS-B air vehicles;
  the external computing unit being further configured for sending the fencing information signal to an external control device controlling the UAV, such that the UAV can be controlled to avoid the collision with the transponder air vehicles and ADS-B air vehicles;
  the method comprising:
  receiving the ADS-B signal and the transponder signal; and
  processing the received ADS-B signal and the received transponder signal, to generate the fencing information signal containing a global positioning system (GPS) position, a speed and altitude for each of the detected transponder air vehicles and ADS-B air vehicles.

13. The computer medium according to claim 12, wherein the code for the software, when executed by the external computing unit, causes the external computing unit to display the GPS positions speed and altitude for each of the detected transponder air vehicles and ADS-B air vehicles detected by the portable control tower, from the fencing information signal.

14. The control system according to claim 1, wherein the external computing unit is configured for running a positioning code to calculate the position of detected transponder air vehicles and ADS-B air vehicles using the fencing information signal.

15. The control system according to claim 1, wherein each of the control towers are deployed on infrastructure elements comprising at least one of: telecommunication antennas, aviation infrastructure, electricity infrastructure, public utilities infrastructure, transportation infrastructure, real estate infrastructure, or satellite infrastructure.

* * * * *